US011149627B2

(12) United States Patent
Sano

(10) Patent No.: US 11,149,627 B2
(45) Date of Patent: Oct. 19, 2021

(54) COOLING-WATER CONTROL VALVE DEVICE

(71) Applicant: DENSO CORPORATION, Kariya (JP)

(72) Inventor: Ryo Sano, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/779,845

(22) Filed: Feb. 3, 2020

(65) Prior Publication Data

US 2020/0256241 A1 Aug. 13, 2020

(30) Foreign Application Priority Data

Feb. 7, 2019 (JP) .............................. JP2019-020883

(51) Int. Cl.
*F01P 7/14* (2006.01)
*F16K 25/00* (2006.01)
*F16K 3/26* (2006.01)

(52) U.S. Cl.
CPC .............. *F01P 7/14* (2013.01); *F16K 25/00* (2013.01); *F01P 2007/146* (2013.01); *F16K 3/26* (2013.01)

(58) Field of Classification Search
CPC ....... F01P 7/14; F01P 2007/146; F16K 25/00; F16K 3/26
USPC ...................................................... 123/41.08
See application file for complete search history.

(56) References Cited

U.S. PATENT DOCUMENTS

| 3,700,006 | A | * | 10/1972 | Marcillaud | ......... | F16K 11/0873 |
| | | | | | | 137/625.21 |
| 4,557,286 | A | * | 12/1985 | Nagano | ................. | F16K 5/0673 |
| | | | | | | 137/72 |
| 4,676,480 | A | * | 6/1987 | Garceau | ................... | F16K 5/201 |
| | | | | | | 251/159 |
| 4,911,408 | A | * | 3/1990 | Kemp | ................... | F16K 5/0673 |
| | | | | | | 251/174 |
| 5,419,532 | A | * | 5/1995 | Fan | ....... | F16K 5/0673 |
| | | | | | | 251/315.08 |
| 10,295,066 | B2 | * | 5/2019 | Kaczmar | .................... | F01P 7/14 |
| 10,513,968 | B2 | * | 12/2019 | Yumisashi | ............... | F16K 11/06 |
| 10,648,577 | B2 | * | 5/2020 | Ozeki | ................ | F16K 11/0712 |
| 2012/0074344 | A1 | * | 3/2012 | Sumiya | ...................... | F16K 1/24 |
| | | | | | | 251/359 |
| 2013/0026406 | A1 | * | 1/2013 | Kawauchi | ............... | F16K 5/205 |
| | | | | | | 251/313 |
| 2014/0291566 | A1 | * | 10/2014 | Yokoyama | ............ | F16K 5/0689 |
| | | | | | | 251/315.01 |

(Continued)

FOREIGN PATENT DOCUMENTS

DE WO2017144047 * 8/2017 ........... F16K 5/0689

*Primary Examiner* — Hung Q Nguyen
*Assistant Examiner* — Anthony Donald Taylor, Jr.
(74) *Attorney, Agent, or Firm* — Nixon & Vanderhye P.C.

(57) ABSTRACT

A cooling-water control valve device includes a valve member, a housing for accommodating the valve member, a pipe unit, a valve seat member, a spring and so on. The pipe unit has, at its axial end on a side facing to the valve member, an outside cylindrical portion and an inside cylindrical portion, which is coaxially arranged with the outside cylindrical portion at a radial-inside position of the outside cylindrical portion. An annular accommodation space is formed between the inside cylindrical portion and the outside cylindrical portion. The spring and the valve seat member are arranged in the annular accommodation space.

13 Claims, 6 Drawing Sheets

(56) References Cited

U.S. PATENT DOCUMENTS

| | | | |
|---|---|---|---|
| 2016/0186870 A1* | 6/2016 | Ricard | F16K 5/205 |
| | | | 251/180 |
| 2016/0319940 A1* | 11/2016 | Funato | F16K 5/06 |
| 2017/0009894 A1* | 1/2017 | Seko | F16K 5/201 |
| 2017/0321812 A1* | 11/2017 | Jang | F16K 11/087 |
| 2017/0335749 A1* | 11/2017 | Maruyama | F16K 11/0873 |
| 2017/0335750 A1* | 11/2017 | Yumisashi | F16K 5/06 |
| 2018/0066758 A1* | 3/2018 | Yumisashi | F16K 27/067 |
| 2018/0340618 A1 | 11/2018 | Seko et al. | |
| 2019/0186641 A1 | 6/2019 | Seko et al. | |

* cited by examiner

COOLING-WATER CONTROL VALVE DEVICE

CROSS REFERENCE TO RELATED APPLICATION

This application is based on Japanese Patent Application No. 2019-20883 filed on Feb. 7, 2019, the disclosure of which is incorporated herein by reference.

FIELD OF TECHNOLOGY

The present disclosure relates to a cooling-water control valve device.

BACKGROUND

A cooling-water control valve device is known in the art, according to which a flow amount of cooling water flowing through an internal combustion engine is controlled. According to the cooling-water control valve device, it includes a housing, a ball-shaped valve member movably provided in the housing, a valve seat member to be pushed to an outer peripheral wall of the ball-shaped valve member and so on.

SUMMARY OF THE DISCLOSURE

It is an object of the present disclosure to provide a cooling-water control valve device, according to which variation for clearances surrounding and/or related to a valve seat member can be reduced, and thereby variation for a position at which a valve member starts its valve opening movement can be reduced. Therefore, it is the object of the present disclosure to provide the cooling-water control valve device, according to which an operation accuracy of the valve member can be improved.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

Figure 1:
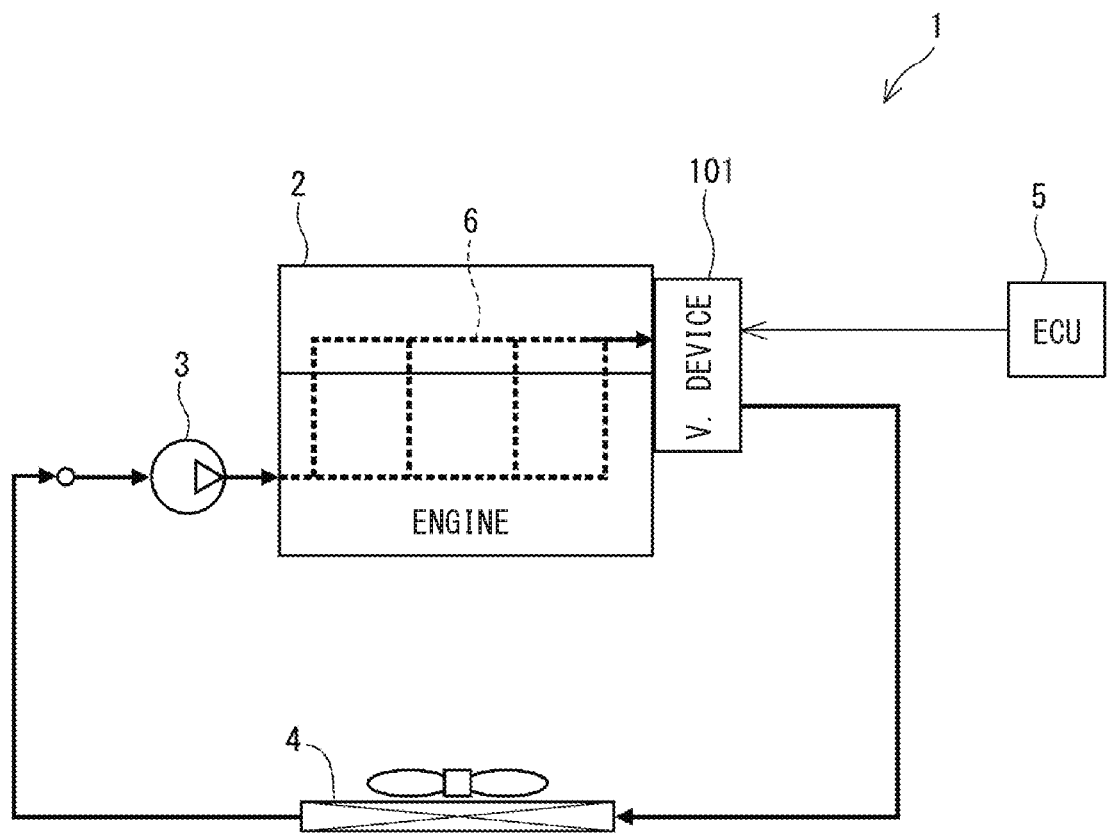
FIG. 1 is a schematic view showing an engine cooling system, to which a cooling-water control valve device according to the present disclosure is applied.

The present disclosure will be explained hereinafter by way of multiple embodiments and/or modifications with reference to the drawings. The same reference numerals are given to the same or similar structures and/or portions in order to avoid repeated explanation.

First Embodiment (Structure)

A cooling-water control valve device 101 according to a first embodiment is provided in a cooling water passage of an engine cooling system 1 for cooling down an internal combustion engine 2 (hereinafter, the engine 2). In the cooling water passage, cooling water passing through the engine 2 is supplied to a radiator 4. The cooling-water control valve device 101 (hereinafter, also referred to as the valve device 101) controls a flow amount of the cooling water.

(Engine Cooling System)

As shown in FIG. 1, the engine cooling system 1 includes the valve device 101, a water pump 3, the radiator 4, an electronic control unit 5 (hereinafter, the ECU 5) and so on. The water pump 3 supplies the cooling water to a water jacket 6. The valve device 101 is provided, for example, at an outlet portion of the water jacket 6 and it controls the flow amount of the cooling water to be supplied to the radiator 4.

The radiator 4 is a heat exchange, which carries out heat exchange between the cooling water and air to cool down temperature of the cooling water. The ECU 5 controls an operation of the valve device 101 to thereby control the flow amount of the cooling water to be supplied to the radiator 4.

(Structure of Cooling-Water Control Valve Device)

Figure 2:
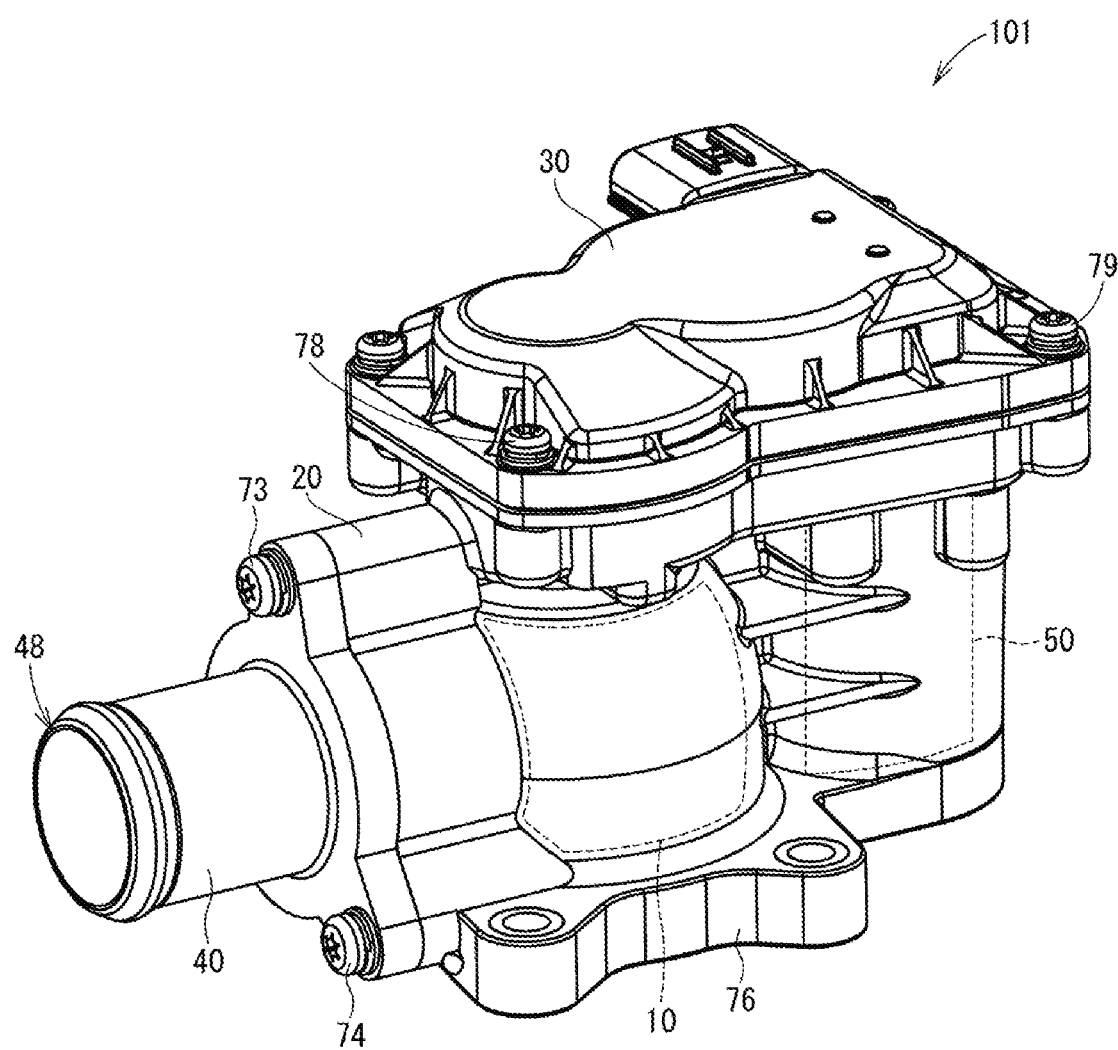
FIG. 2 is a schematic perspective view showing the cooling-water control valve device of a first embodiment of the present disclosure.
Figure 3:
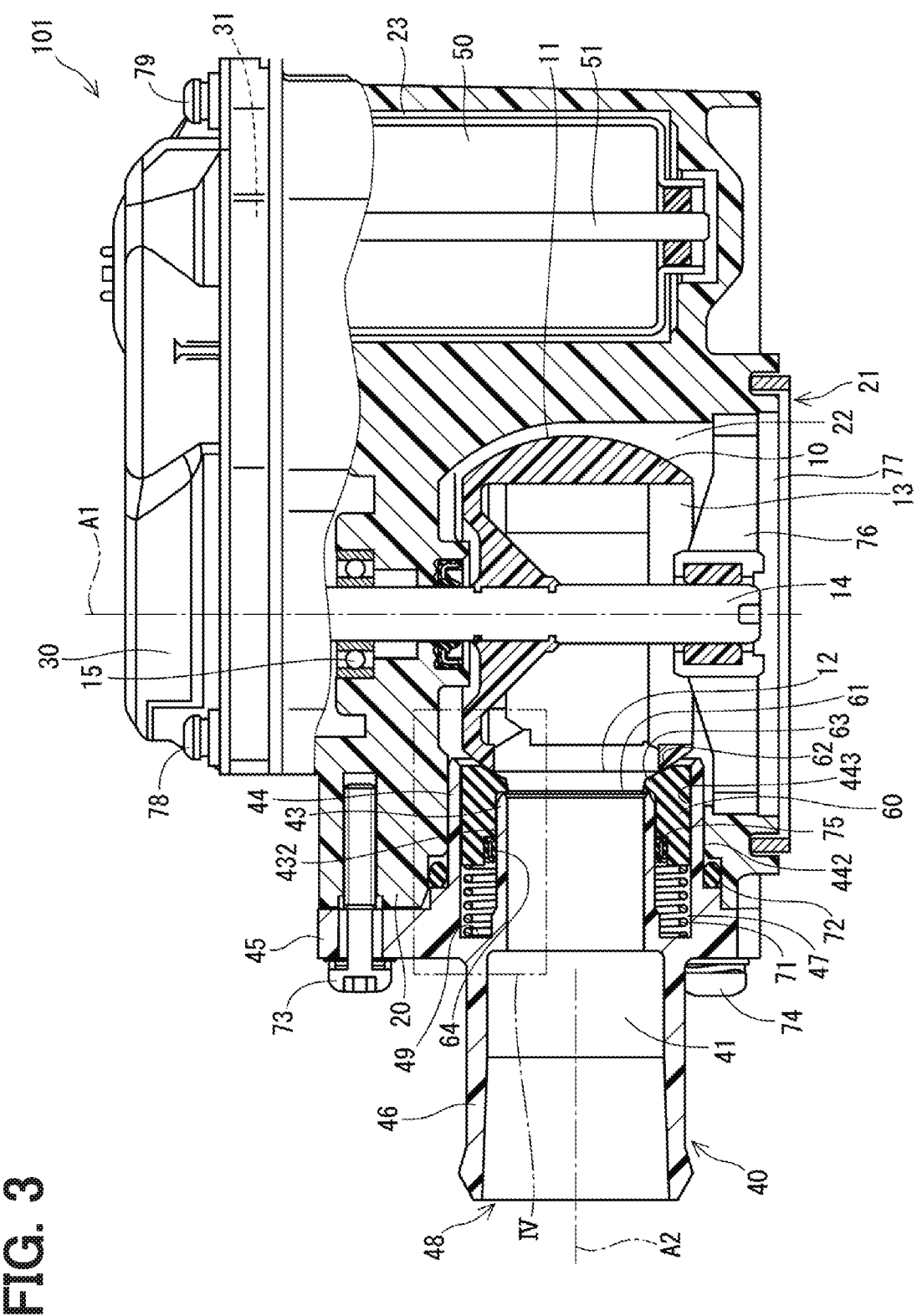
FIG. 3 is a schematic cross-sectional view showing the cooling-water control valve device of the first embodiment.

A structure of the valve device 101 will be explained with reference to FIGS. 2 to 4. As shown in FIGS. 2 and 3, the valve device 101 includes a valve member 10, a housing 20, a sensor cover 30, a pipe unit 40, an electric motor 50, a valve seat member 60 (shown in FIG. 3), a spring 71 (shown in FIG. 3), a bearing support plate 76 and so on. Each of the valve member 10, the housing 20, the sensor cover 30 and the pipe unit 40 is made of, for example, resin. The cross-sectional view of FIG. 3 shows a valve condition that the valve device 101 is in a valve opened condition. The valve device 101 controls the flow amount of the cooling water to the engine 2 by rotating the valve member 10.

As shown in FIG. 3, the housing 20 includes an inlet port 21, a valve accommodation space 22, a motor accommodation space 23 and so on. For example, the housing 20 is directly fixed to the engine 2. The inlet port 21 forms an inlet portion provided in the water jacket 6 of the engine 2 and introduces the cooling water into an inside of the housing 20. The valve accommodation space 22 forms a space for movably accommodating the valve member 10 and a part of the pipe unit 40. The valve accommodation space 22 is communicated to the inlet port 21. The motor accommodation space 23 forms a space separated from the valve accommodation space 22 and it accommodates the electric motor 50.

The valve member 10 has an outer configuration of an almost ball shape and the valve member 10 is formed in a tubular shape. The valve member 10 has a ball-shaped surface 11, a side-wall valve opened portion 12, a bottom-side valve opened portion 13 and so on. The ball-shaped surface 11 is formed on an outer wall of a ball shape and it has a convex spherical surface. The ball-shaped surface 11 slides on the valve seat member 60, as explained below, when the valve member 10 is rotated. The side-wall valve opened portion 12 is formed in an almost circular shape and it penetrates a part of the ball-shaped surface 11 in a radial direction of the valve member 10. The bottom-side valve opened portion 13 is formed in the valve member 10 at its bottom side closer to the bearing support plate 76 in an axial direction of the valve member 10.

A valve shaft 14 passes through a center portion of the valve member 10 in the axial direction. In FIG. 1, the axial direction of the valve shaft 14 coincides with a vertical direction. The valve shaft 14 is formed in a bar shape and made of metal. An axial end (a lower-side end) of the valve shaft 14 on a side closer to the bearing support plate 76 is rotatably supported by the bearing support plate 76. Another axial end (an upper-side end) of the valve shaft 14 on a side closer to the sensor cover 30 is rotatably supported by a ball bearing 15 fixed to the housing 20.

The valve member 10 is rotatably supported by the bearing support plate 76 and the ball bearing 15, together with the valve shaft 14. The valve member 10 is rotatable in the valve accommodation space 22 around a valve axis A1 of the valve shaft 14. The bearing support plate 76 has multiple openings 77, through which the cooling water flows. The cooling water flows from the water jacket 6 into the valve accommodation space 22 via the openings 77 formed in the bearing support plate 76 and further flows into an inside of the valve member 10 via the bottom-side valve opened portion 13.

The electric motor 50 is accommodated in the motor accommodation space 23 in such a way that a motor shaft 51 is in parallel to the valve shaft 14. The electric motor 50 is rotated when electric power is supplied thereto and the electric motor 50 outputs its torque from its output portion. A gear unit (not shown) having multiple gears is connected to an axial end (a upper-side end) of the motor shaft 51 on a side closer to the sensor cover 30 in the axial direction (that is, on an output side of the electric motor 50). The gear unit is connected to the valve shaft 14 on the side closer to the sensor cover 30. When the electric motor 50 is rotated and the torque is outputted from the output portion, rotational speed is reduced in the gear unit and transmitted to the valve shaft 14. The valve member 10 is thereby rotated in the valve accommodation space 22 around the valve axis A1. An overlapping area between the side-wall valve opened portion 12 and a valve-seat opened portion 61 (explained below) of the pipe unit 40 is changed depending on a rotational position of the valve member 10.

The sensor cover 30 is formed, for example, in a dish shape. The sensor cover 30 is fixed to the housing 20 by multiple bolts 78 and 79, to cover the housing 20 on a side opposite to the bearing support plate 76. The sensor cover 30 forms a gear accommodation space 31 in its inside. The gear accommodation space 31 is connected to the motor accommodation space 23.

The pipe unit 40 is formed in a tubular shape and it forms therein a fluid passage 41, through which the cooling water flows. The pipe unit 40 is connected to the housing 20 in such a way that the valve-seat opened portion 61 (which corresponds to an opening end of the pipe unit 40 on a side closer to the valve member 10) is located at a position opposed to the ball-shaped surface 11 of the valve member 10 in the radial direction. A center axis A2 of the pipe unit 40 (hereinafter, the pipe axis A2) intersects at a right angle with the valve axis A1 of the valve shaft 14.

The pipe unit 40 includes an inside cylindrical portion 43, an outside cylindrical portion 44, a flange portion 45, an outlet-side cylindrical portion 46 and so on. Each of the inside cylindrical portion 43 and the outside cylindrical portion 44 is formed at an axial end of the pipe unit 40 on a side closer to the valve member 10 (a right-hand side in FIG. 3). Each of the inside cylindrical portion 43 and the outside cylindrical portion 44 is formed in an annular shape on a cross section perpendicular to an axial direction of the pipe unit 40 (the center axis A2). The inside cylindrical portion 43 is coaxially formed with the outside cylindrical portion 44 at a radial-inside position of the outside cylindrical portion 44. In other words, the axial end of the pipe unit 40 on the side closer to the valve member 10 has a double pipe structure formed by the inside and the outside cylindrical portions 43 and 44. An axial length of the outside cylindrical portion 44 is larger than that of the inside cylindrical portion 43. An annular accommodation space 47 is formed between an inner peripheral wall 443 of the outside cylindrical portion 44 and an outer peripheral wall 432 of the inside cylindrical portion 43.

An O-ring 72 made of rubber is provided at a position between the housing 20 and an outer peripheral wall 442 of the outside cylindrical portion 44 on a side closer to the flange portion 45. The O-ring 72 corresponds to a sealing member. The O-ring 72 prevents a leakage of the cooling water via a clearance between the housing 20 and the outside cylindrical portion 44.

The outlet-side cylindrical portion 46 is connected to each of the inside and the outside cylindrical portions 43 and 44 on a side opposite to the valve member 10, wherein each of the outlet-side cylindrical portion 46 and the inside and the outside cylindrical portions 43 and 44 commonly has the center axis A2. An axial end of the outlet-side cylindrical portion 46 on the side opposite to the valve member 10, that is, a left-hand end of the outlet-side cylindrical portion 46 in the drawing, is connected to the radiator 4. The outlet-side cylindrical portion 46 forms an outlet port 48, through which the cooling water having passed through the engine 2 is supplied to the radiator 4. An inner diameter of the outlet-side cylindrical portion 46 is slightly smaller than that of the outside cylindrical portion 44 but larger than that of the inside cylindrical portion 43.

The flange portion 45 extends in a radial-outward direction of the pipe unit 40 from the axial end of the outside cylindrical portion 44 on the side opposite to the valve member 10. When the flange portion 45 is fixed to the housing 20 by multiple bolts 73 and 74, the pipe unit 40 is firmly attached to the housing 20.

The valve seat member 60 and the spring 71 are accommodated in the annular accommodation space 47, wherein the valve seat member 60 and the spring 71 are arranged in this order in the axial direction of the pipe unit 40 away from the valve member 10. The spring 71 corresponds to a biasing member. The valve seat member 60 is formed in a cylindrical shape and made of, for example, fluorine contained resin having a friction coefficient lower than a predetermined value. The valve-seat opened portion 61 is formed at a radial-center position of the valve seat member 60 in such a way that the valve-seat opened portion 61 extends in the axial direction of the pipe unit 40. A valve seat surface 62 is formed at an axial end of the valve seat member 60 on the side closer to the valve member 10 (that is, at a right-hand axial end in the drawing), wherein the valve seat surface 62 is formed by a recessed spherical surface and formed in an annular shape. When the valve seat surface 62 is in contact with the ball-shaped surface 11 of the valve member 10, a gap between the valve member 10 and the valve seat member 60 is sealed.

Figure 4:
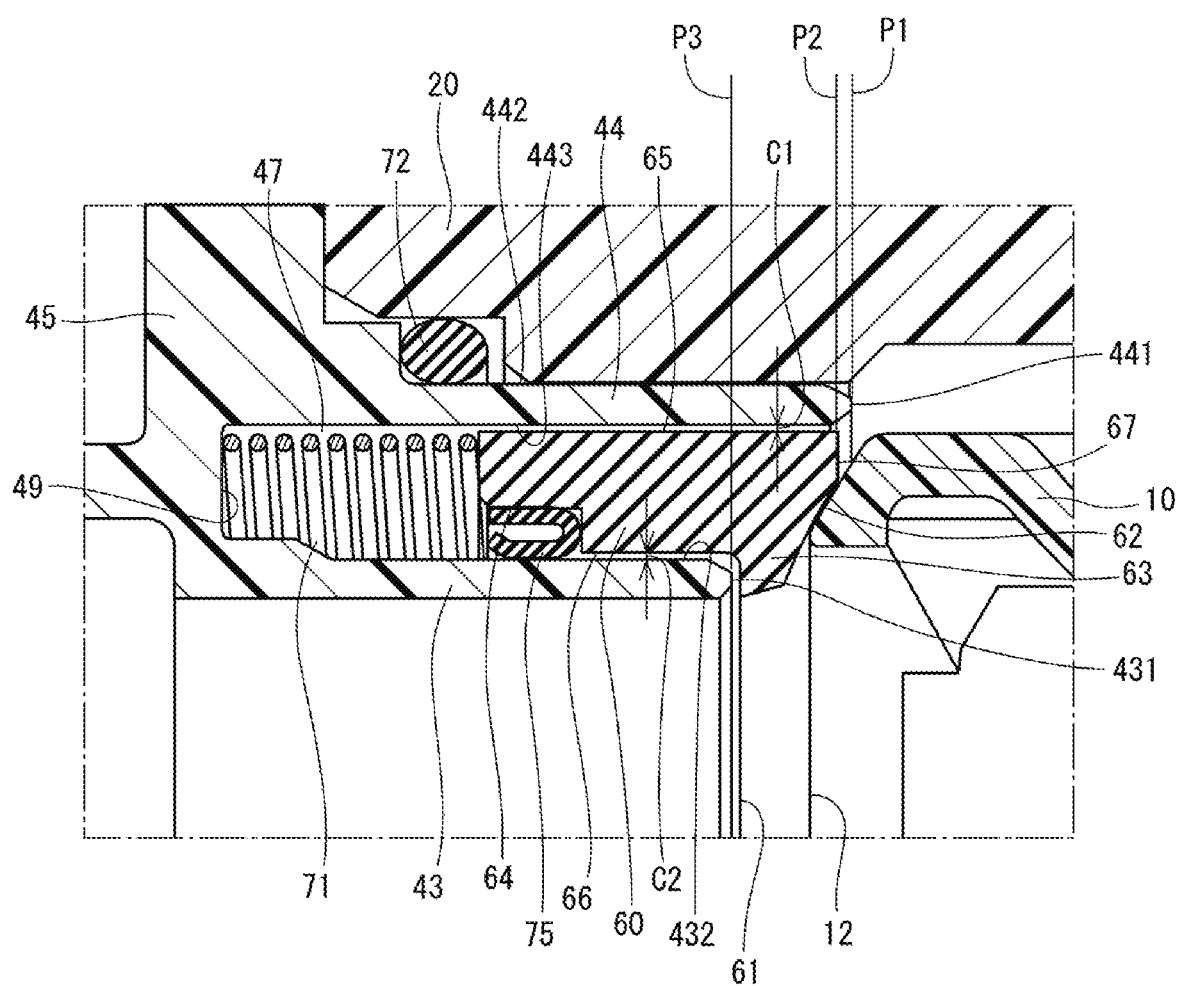
FIG. 4 is an enlarged cross-sectional view showing a portion IV of the cooling-water control valve device, which is encircled by a two-dot-chain line in FIG. 3.

As shown in FIG. 4, a seat projection 63 of an annular shape is formed in the valve seat member 60 in such a way that the seat projection 63 is projected from the valve seat surface 62 in a radial-inward direction of the valve seat member 60 and inclined in a direction to the outlet port 48

(that is, in the axial direction away from the valve member 10, namely in the leftward direction in FIG. 4). The seat projection 63 continuously extends in a circumferential direction of the valve seat member 60. The seat projection 63 covers an axial end 431 of the inside cylindrical portion 43 on the side closer to the valve member 10. A stepped portion 64 is formed in an inner peripheral surface 66 of the valve seat member 60 on a side axially opposite to the valve member 10. A radial thickness of the stepped portion 64 is almost a half of a radial thickness of the valve seat member 60. An axial length of the stepped portion 64 is almost one-third of an axial length of the valve seat member 60.

A V-packing 75 made of rubber is provided in the stepped portion 64. The V-packing 75 is made of, for example, rubber (EPDM or the like) and formed in an annular shape, wherein a V-shaped lip portion is elastically deformed by inner pressure. According to the above structure, the valve seat member 60 can axially move in the annular accommodation space 47, in a condition that a gap between the inner peripheral surface 66 of the valve seat member 60 and the outer peripheral wall 432 of the inside cylindrical portion 43 is sealed.

The spring 71 is composed of, for example, a coil spring. The spring 71 is provided in the annular accommodation space 47 at a position axially opposite to the valve member 10. One end of the spring 71 (a right-hand end thereof) is in contact with the axial end of the valve seat member 60 (the left-hand end thereof) on the side opposite to the valve member 10, while the other end of the spring 71 (a left-hand end thereof) is in contact with a closed end wall 49 of the annular accommodation space 47 on the side opposite to the valve member 10. The spring 71 biases the valve seat member 60 in the direction to the valve member 10. As a result, the valve seat surface 62 of the valve seat member 60 is pushed to the ball-shaped surface 11 of the valve member 10.

The double pipe structure of the pipe unit 40 as well as a structure of surrounding parts of the valve seat member 60 will be further explained. As shown in FIG. 4, each of the axial end 431 of the inside cylindrical portion 43 and an axial end 441 of the outside cylindrical portion 441 on the side closer to the valve member 10 has a sharp end. In the axial direction of the pipe unit 40 away from the valve member 10, the axial end 441 of the outside cylindrical portion 44, an axial end 67 of the valve seat member 60 on the side closer to the valve member 10, and the axial end 431 of the inside cylindrical portion 43 are located in this order. In FIG. 4, a position P1 corresponds to a position of the axial end 441 of the outside cylindrical portion 44. A position P2 corresponds to a position of the axial end 67 of the valve seat member 60. A position P3 corresponds to a position of the axial end 431 of the inside cylindrical portion 43. The outside cylindrical portion 44 entirely covers an outer peripheral surface 65 of the valve seat member 60 in the axial direction thereof.

A radial clearance C1 between the outer peripheral surface 65 of the valve seat member 60 and the inner peripheral wall 443 of the outside cylindrical portion 44 is smaller than a radial clearance C2 between the inner peripheral surface 66 of the valve seat member 60 and the outer peripheral wall 432 of the inside cylindrical portion 43. Each of these radial clearances C1 and C2 is provided in view of variation of component tolerances to make smaller a positional variation when staring an opening movement of the valve member 10. Each of the radial clearances C1 and C2 is set at a predetermined value.

In addition, since the relationship between the radial clearances C1 and C2 is made in such a way that the radial clearance C1 is smaller than the radial clearance C2, the outer peripheral surface 65 of the valve seat member 60 is positioned by the inner peripheral wall 443 of the outside cylindrical portion 44 in the radial direction. In addition, since the V-packing 75 is provided at the inner peripheral surface 66 of the valve seat member 60, a portion of the valve seat member 60 on an inner peripheral side is mainly movable relative to the inside cylindrical portion 43 in the axial direction of the valve seat member 60. The outer peripheral surface 65 of the valve seat member 60 is occasionally brought into contact with the inner peripheral wall 443 of the outside cylindrical portion 44.

(Operation)

An operation of the valve device 101 will be explained. In the present embodiment, temperature of the cooling water is increased after passing through the water jacket 6 of the engine 2 and the cooling water flows into the valve device 101 via the inlet port 21. The cooling water further flows to the inside of the valve member 10 via the bottom-side valve opened portion 13. When the valve device 101 is opened by the rotation of the valve member 10, the cooling water supplied to the inside of the valve member 10 is introduced to the fluid passage 41 of the pipe unit 40 through the overlapping area between the side-wall opened portion 12 and the valve-seat opened portion 61.

The flow amount of the cooling water flowing into the pipe unit 40 depends on the overlapping area between the side-wall opened portion 12 and the valve-seat opened portion 61, which is changed by the rotational position of the valve member 10. The cooling water flowing through the fluid passage 41 is guided to the radiator 4 via the outlet port 48. The temperature of the cooling water is decreased when passing through the radiator 4. The cooling water, the temperature of which is decreased by the radiator 4, returns to the engine 2 to thereby cool down the same.

When the valve device 101 is opened, the fluid passage 41 of the pipe unit 40 is communicated to the inside of the valve member 10 so that the cooling water flows from the inside of the valve device 101 to the outside of the valve device 101 via the pipe unit 40.

When the overlapping area between the side-wall opened portion 12 of the valve member 10 and the fluid passage 41 (that is, the valve-seat opened portion 61) is zero, namely when the valve-seat opened portion 61 is entirely covered by the ball-shaped surface 11 of the valve member 10, the flow of the cooling water from the inside of the valve member 10 to the fluid passage 41 is blocked off. This condition corresponds to a valve fully-closed condition. A position of the valve member 10, at which the overlapping area between the side-wall opened portion 12 and the valve-seat opened portion 61 (namely, the fluid passage 41) is just changed from zero to a value larger than zero, corresponds to a starting position of the valve member 10 for a valve opening movement.

As above, it is possible to control the flow amount of the cooling water flowing through the fluid passage 41 by changing the rotational position of the valve member 10. The rotational position of the valve member 10 is controlled by the ECU 5. When the valve member 10 is rotated by the rotational torque of the electric motor 50 around the valve axis A1, the valve seat surface 62 of the valve seat member 60 and the ball-shaped surface 11 of the valve member 10 slide relative to each other so that they are relatively rotated in the circumferential direction of the valve member 10. In the above relative rotation, the valve seat surface 62 of the valve seat member 60 is aligned to the ball-shaped surface 11 of the valve member 10, at a position in which the outer peripheral surface 65 of the valve seat member 60 is in contact with the inner peripheral wall 443 of the outside cylindrical portion 44. During the above relative rotation, the inner peripheral surface 66 of the valve seat member 60 and the outer peripheral wall 432 of the inside cylindrical portion 43 are slidable to each other.

In addition, even when the ball-shaped surface 11 of the valve member 10 is going to move in a displaced direction from the valve seat surface 62, a tight contacting condition between the valve seat surface 62 and the ball-shaped surface 11 can be maintained by the reciprocal movement of the valve seat member 60 in its axial direction, more exactly, by the reciprocal movement of the portion of the valve seat member 60 on the side of the inner peripheral surface 66, wherein the valve seat member 60 is biased by the spring 71 to the valve member 10.

(Advantages)

(A1) In the present embodiment, the inside cylindrical portion 43 and the outside cylindrical portion 44 are provided in the pipe unit 40 and the valve seat member 60 is accommodated in the annular accommodation space 47 formed between the inside and the outside cylindrical portions 43 and 44. In other words, the valve seat member 60 is supported not by the housing 20 but by the axial end of the pipe unit 40 having the double pipe structure.

In a valve device of a comparative example, for example, as disclosed in Japanese Patent No. 6330947 (corresponding to US 2017/0009894 A1), a valve seat member is movably supported at an outlet port of a housing. In such a valve device, it is necessary to make respective clearances larger in order to absorb various dimensional variations in the related parts for supporting the valve seat member (for example, including the housing, a sleeve, a spacer and so on). When clearances between respective parts are made to be larger, an amount of freedom for the position of the valve seat member becomes larger. As a result, it may become a problem that alignment accuracy for a valve seat surface of the valve seat member to a valve member is decreased.

The structure of the valve device of the above comparative example will be further explained. The valve seat member has an annular valve seat surface. The valve seat surface is protruded into a valve accommodation space formed in the housing. When the valve seat surface is in contact with an outer peripheral surface having a spherical surface of a ball-shaped valve member, a gap between the valve seat member and the ball-shaped valve member is sealed. The valve seat member is supported by the housing by means of a spacer, a sleeve or the like. The spacer is fixed to an inner peripheral wall of an outlet pipe portion of the housing. The sleeve is provided at a position neighboring to the spacer in such a manner that the sleeve is positioned in a radial direction of the outlet pipe portion but movable in an axial direction of the outlet pipe portion.

When the valve seat surface is aligned to the valve member, a predetermined clearance S1 is formed between an outer peripheral wall of the sleeve and an inner peripheral wall of the outlet pipe portion in order to absorb dimensional variations of various related parts (such as, the housing, the valve seat member, the sleeve, the spacer and so on) for supporting the valve seat member. In addition, a predetermined clearance S2 is formed between an inner peripheral wall of the spacer and an outer peripheral wall of the sleeve.

In the valve device of the above prior art, an alignment amount of the valve seat surface to the valve member is decided by the above clearances S1 and S2. However, since there are multiple related parts, variation causes in component tolerances may be increased and thereby it becomes necessary to increase the clearances S1 and S2.

However, when the clearances S1 and S2 become larger, it is possible to ensure the sealing performance for the valve member on one hand, but alignment accuracy of the valve seat surface may be decreased on the other hand because of a large flexibility for the position of the valve seat member. As a result, there may occur a variation for a position at which the valve member starts its valve opening movement.

According to the present embodiment, however, the radial clearances C1 and C2 are decided solely depending on the dimension of the valve seat member 60 and the dimension of the pipe unit 40. Therefore, there is a small number of contributary factors, which are related to variations of the component tolerances.

Since it is not necessary to make the radial clearances C1 and C2 larger and the valve seat member 60 is not adversely influenced by burrs in the outlet port, it is possible to increase the accuracy of the radial clearances in the valve seat member 60. In addition, it becomes possible to decrease variations for the starting position of the valve member 10 for its valve opening movement to thereby increase the accuracy of the operation of the valve device 101.

(A2) The valve seat member 60 is made of the material, which is easily deformed. Therefore, in the case of a valve seat member made of such material, the valve seat member does not have sufficient stiffness and may be excessively deformed. For example, in the comparative example, it is necessary to prepare the sleeve made of metal having the higher stiffness, to thereby decrease an amount of deformation. According to the present embodiment, however, the pipe unit 40 is so made to have the double pipe structure and the valve seat member 60 is arranged in the annular accommodation space 47 formed by the double pipe structure. In the valve seat member 60 of the present embodiment, it is possible to ensure the necessary radial thickness and the necessary axial length. Accordingly, it is possible to increase the stiffness of the valve seat member 60 and to prevent the possible deformation in the radial direction by the outside cylindrical portion 44. In other words, it is possible to eliminate the sleeve, which was necessary in the comparative example. In the present embodiment, a number of parts can be reduced.

(A3) Since the outer peripheral surface 65 of the valve seat member 60 is entirely covered by the outside cylindrical portion 44, it is possible to avoid a situation that the valve seat member 60 is damaged or broken when the valve device 101 is assembled.

(A4) In the present embodiment, the axial end 441 of the outside cylindrical portion 44 on the side closer to the valve member 10, the axial end 67 of the valve seat member 60 on the side closer to the valve member 10, and the axial end 431 of the inside cylindrical portion 43 on the side closer to the valve member 10 are arranged in this order in the axial direction of the valve seat member 60 away from the valve member 10. As a result, it is possible to avoid a situation that extraneous material, such as, casting sand or the like, may enter the radial clearances C1 and/or C2.

(A5) In the present embodiment, since the seat projection 63 extending in the circumferential direction is formed at the inner periphery of the valve seat surface 62 and covers the axial end 431 of the inside cylindrical portion 43, it is possible to more surely prevent that the extraneous material enters the radial clearance C2. In addition, as a result of forming the seat projection 63, it is possible to realize the structure, according to which the valve seat member 60 is more easily deformed and the gap at the radial-inside portion of the valve seat member 60 can be easily sealed.

(A6) In the present embodiment, since the V-packing 75 is arranged between the inside cylindrical portion 43 and the valve seat member 60, it is possible to avoid the leakage of the cooling water via the gap between the valve seat member 60 and the pipe unit 40. In addition, the contacting area between the inner peripheral wall 443 of the outside cylindrical portion 44 and the outer peripheral surface 65 of the valve seat member 60 is larger than that between the outer peripheral wall 432 of the inside cylindrical portion 43 and the inner peripheral surface 66 of the valve seat member 60. In the present embodiment, since the movement of the valve seat member 60 is restricted on the side of the outer peripheral surface 65, while the gap between the valve seat member 60 and the pipe unit 40 is sealed on the side of the inner peripheral surface 66, it is possible to avoid a situation that the valve seat member 60 is inclined when the valve seat surface 62 is aligned to the ball-shaped surface 11 of the valve member 10. Namely, it is possible to increase the alignment accuracy.

Second Embodiment

Figure 5:
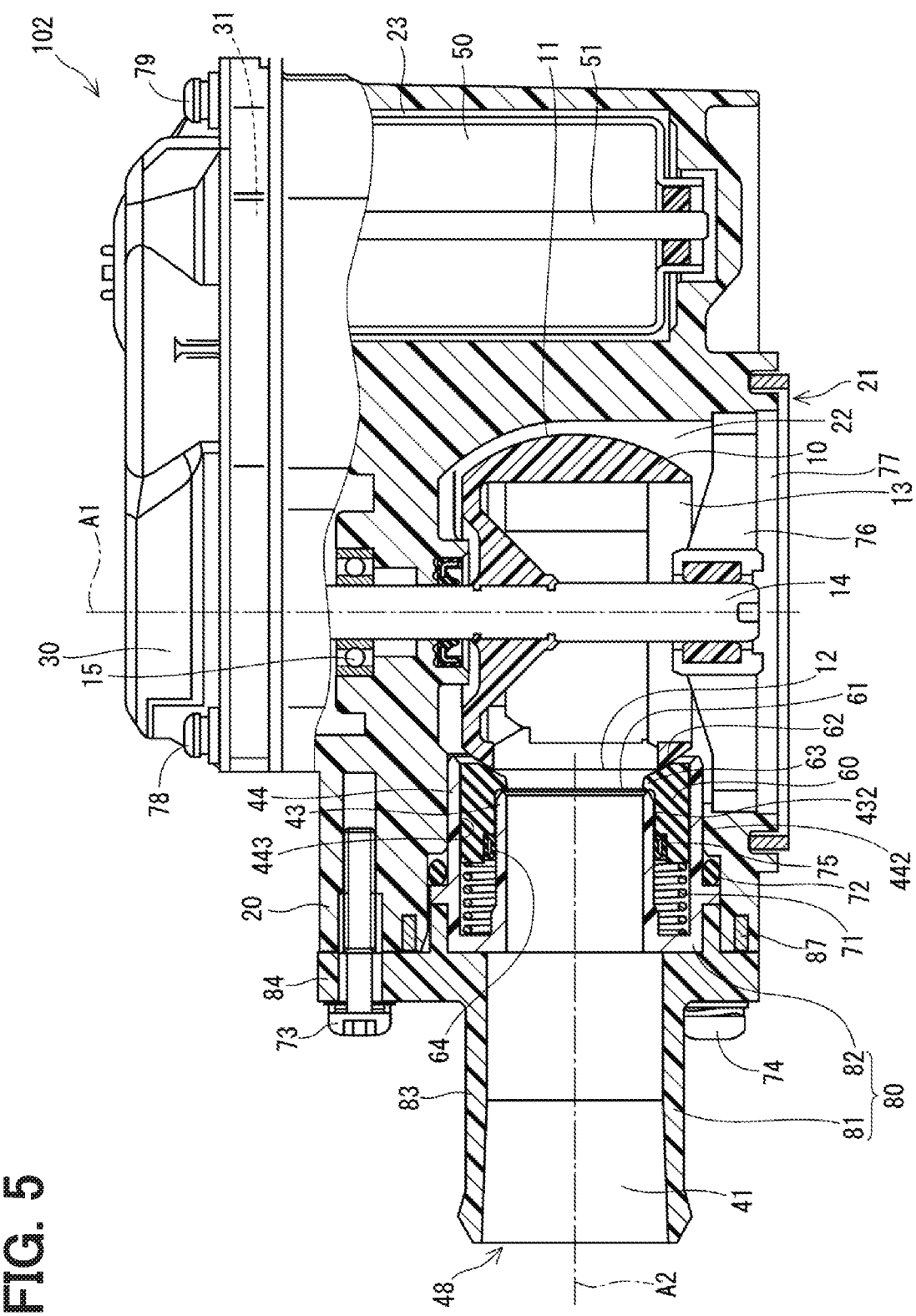
FIG. 5 is a schematic cross-sectional view showing the cooling-water control valve device according to a second embodiment of the present disclosure.

A cooling-water control valve device 102 (hereinafter, the valve device 102) of a second embodiment will be explained with reference to FIG. 5. In the second embodiment, a structure of a pipe unit 80 is different from that of the first embodiment. The pipe unit 80 has an outlet-side pipe member 81 and a spacer member 82, which are separately formed from each other. The outlet-side pipe member 81 has a cylindrical pipe portion 83 and a flange portion 84, which are integrally formed with each other. The spacer member 82 has the outside cylindrical portion 44 and the inside cylindrical portion 43, which are integrally formed with each other. The spacer member 82 has the double pipe structure. A gasket member 87 is provided between the flange portion 84 and the housing 20.

According to the second embodiment, the same advantages to those of the first embodiment can be obtained. In addition, since the pipe unit 80 is divided into the outlet-side pipe member 81 and the spacer member 82, each of the outlet-side pipe member 81 and the spacer member 82 can be made of different material from each other. For example, when the spacer member 82 requiring high accuracy is made of expensive resin material and the outlet-side pipe member 81 is made of material having a reasonable price, it is possible to reduce a manufacturing cost. For example, PPS (Polyphenylene sulfide) can be used as the material for the outlet-side pipe member 81, while PA66 can be used as the material for the spacer member 82.

Third Embodiment

Figure 6:
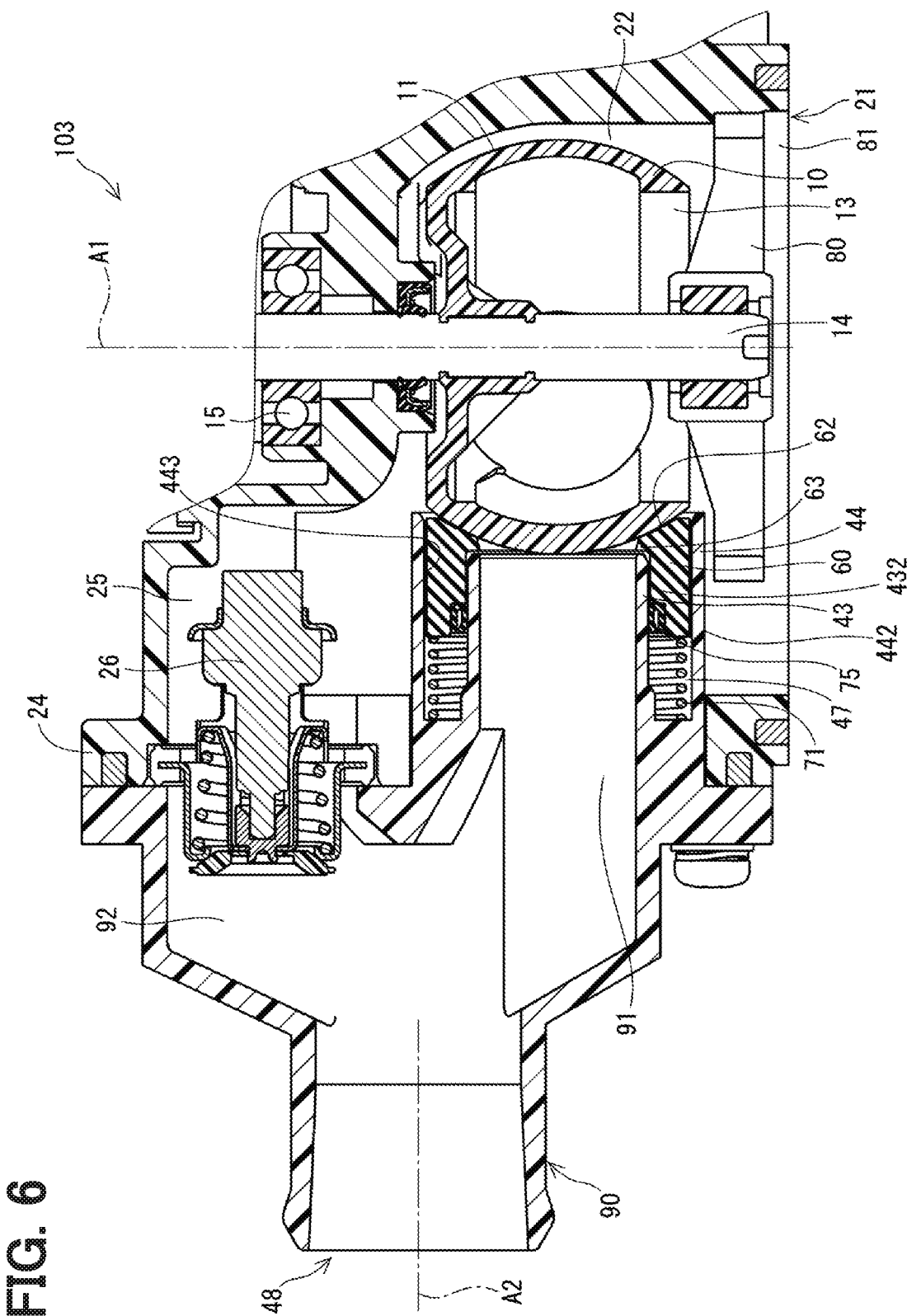
FIG. 6 is a schematic cross-sectional view showing the cooling-water control valve device according to a third embodiment of the present disclosure.

A cooling-water control valve device 103 (hereinafter, the valve device 103) of a third embodiment will be explained with reference to FIG. 6. FIG. 6 shows a valve condition that the valve device 103 is in the valve closed condition.

A housing 24 of the valve device 103 includes a relief-valve accommodation space 25 in addition to the valve accommodation space 22 and the motor accommodation space 23 (not shown in FIG. 6). The relief-valve accommodation space 25 is located at a position, which is a radial-outer position of the outside cylindrical portion 44 of a pipe unit 90 on the side closer to the sensor cover 30 (not shown in FIG. 6). The relief-valve accommodation space 25 is a space for accommodating a relief valve 26 and communicated to the valve accommodation space 22.

The pipe unit 90 has a main fluid passage 91, through which the cooling water passing through the side-wall valve opened portion 12 (not shown in FIG. 6) flows, and a relief-valve side fluid passage 92. The main fluid passage 91 and the relief-valve side fluid passage 92 join together at a downstream side thereof. The relief valve 26 is opened, when the temperature and/or pressure of the cooling water in the relief-valve accommodation space 25 becomes higher than a predetermined value. The cooling water flows out from the relief-valve accommodation space 25 to the outlet port 48, when the relief valve 26 is opened. The valve seat member 60 is arranged in the annular accommodation space 47 between the inside cylindrical portion 43 and the outside cylindrical portion 44 of the pipe unit 90, in the same manner to the above first and second embodiments.

For example, in the valve device of the prior art (Japanese Patent No. 6330947), the valve seat member is supported by the housing of the valve device and it is necessary to support the valve seat member at the position neighboring to the valve accommodation space of the cylindrical shape. In other words, it is necessary to form a thick wall portion of the housing at such a position closer to the valve accommodation space. Therefore, it is difficult to form the space for the relief valve at the position around the valve accommodation space. As above, since the valve seat member is supported by the housing in the above prior art, an inside configuration of the housing receives limitations.

According to the present embodiment, however, since the valve seat member 60 is arranged in the annular accommodation space 47 between the inside cylindrical portion 43 and the outside cylindrical portion 44 of the pipe unit 90, it is not necessary to support the valve seat member by the housing 24. As a result, the valve device 103 does not receive limitations for the inside configuration thereof and has more flexibility for designing the inside space of the valve device 103.

According to the present embodiment, the same advantages to those of the first embodiment can be obtained. In addition, it is possible to form the space for accommodating the relief valve 26 in the housing 24 and to increase the flexibility for designing the configuration of the housing 24.

(Modifications)

In each of the above embodiments, the outside cylindrical portion 44 covers the entire portion of the outer peripheral surface 65 of the valve seat member 60. In an alternative modification, the outside cylindrical portion 44 may cover a part of the outer peripheral surface 65 of the valve seat member 60.

In each of the above embodiments, the gap between the housing 20/24 and the valve seat member 60 is sealed at the inner peripheral surface 66 of the valve seat member 60. In an alternative modification, the gap between the housing and the valve seat member may be sealed at the outer peripheral surface of the valve seat member. In such a modification, the V-packing 75 is arranged in a space between the outer peripheral surface 65 of the valve seat member 60 and the inner peripheral wall 443 of the outside cylindrical portion 44.

In each of the above embodiments, the pipe axis A2 for the pipe unit 40, 80 or 90 intersects with the valve axis A1 of the valve shaft 14 at the right angle. However, the pipe axis A2 may intersect with the valve axis A1 at an angle other than 90 degrees.

In each of the above embodiments, the valve device 101, 102 or 103 controls the flow amount of the cooling water, which is supplied to the engine 2 via the radiator 4. The valve device may be used for controlling the flow amount of the cooling water, which flows through a heater core, a throttle valve, an oil cooler and so on.

The present disclosure is not limited to the above embodiments and/or modifications but can be further modified in various manners without departing from a spirit of the present disclosure.

What is claimed is:

1. A cooling-water control valve device for controlling a flow amount of cooling water passing through an internal combustion engine, the cooling-water control valve device comprising:
    a valve body member having a valve opened portion in a side wall of the valve body member, through which the cooling water flows, the valve body member being rotatable around a valve axis;
    a housing for movably accommodating the valve body member, the housing being made of resin;
    a pipe unit connected to the housing and operatively communicated to the valve opened portion when the cooling-water control valve device is in a valve opened condition, such that the cooling water flows through an inside of the pipe unit;
    a valve seat member having a cylindrical shape and movable in an axial direction of the pipe unit, the valve seat member having a valve seat surface of an annular shape which is movably in contact with the side wall of the valve body member for sealing a gap between the valve body member and the pipe unit; and
    a biasing member for biasing the valve seat member in a direction to the valve body member in such a way that the valve seat member is pushed to the side wall of the valve body member,
    wherein the pipe unit has an inside cylindrical portion, an outside cylindrical portion, and a flange portion which are integrally formed with each other as one unit by a single continuous material, the flange portion extending in a radial-outward direction of the pipe unit from an axial end of the outside cylindrical portion,
    wherein the inside cylindrical portion and the outside cylindrical portion are coaxially arranged with each other,
    wherein the inside cylindrical portion is formed at a radial-inside position of the outside cylindrical portion,
    wherein an annular accommodation space is formed between the inside cylindrical portion and the outside cylindrical portion,
    wherein the biasing member and the valve seat member are provided in the annular accommodation space, such that the biasing member biases the valve seat member in a direction to the valve body member,
    wherein an axial length of the outside cylindrical portion is larger than that of the inside cylindrical portion,
    wherein the inside cylindrical portion and the outside cylindrical portion are inserted into the housing made of resin, and the flange portion is firmly attached to the housing made of resin by bolts,
    wherein the valve seat member has a seat projection extending from an inner periphery of the valve seat surface and projecting in a radial-inward direction of the valve seat member, and
    the seat projection covers an axial end of the inside cylindrical portion.

2. The cooling-water control valve device according to claim 1, wherein
    the outside cylindrical portion entirely covers an outer peripheral surface of the valve seat member.

3. The cooling-water control valve device according to claim 1, wherein
    a radial clearance between an outer peripheral surface of the valve seat member and an inner peripheral wall of the outside cylindrical portion is smaller than a radial clearance between an inner peripheral surface of the valve seat member and an outer peripheral wall of the inside cylindrical portion, and
    the outer peripheral surface of the valve seat member is positioned to the inner peripheral wall of the outside cylindrical portion in a radial direction of the valve seat member.

4. The cooling-water control valve device according to claim 3, wherein
    a packing is provided between the inner peripheral surface of the valve seat member and the outer peripheral wall of the inside cylindrical portion.

5. The cooling-water control valve device according to claim 1, wherein
    the axial end of the outside cylindrical portion is a first axial end of the outside cylindrical portion, and
    a second axial end of the outside cylindrical portion, an axial end of the valve seat member, and the axial end of the inside cylindrical portion are arranged in this order in the axial direction of the pipe unit away from the valve body member.

6. The cooling-water control valve device according to claim 1, wherein
    a seal member is provided between an outer peripheral wall of the outside cylindrical portion and the housing.

7. A cooling-water control valve device for controlling a flow amount of cooling water passing through an internal combustion engine, the cooling-water control valve device comprising:
    a valve body member having a valve opened portion in a side wall of the valve body member, through which the cooling water flows, the valve body member being rotatable around a valve axis;
    a housing for movably accommodating the valve body member, the housing being made of resin;
    a pipe unit connected to the housing and operatively communicated to the valve opened portion when the cooling-water control valve device is in a valve opened condition, such that the cooling water flows through an inside of the pipe unit;
    a valve seat member having a cylindrical shape and movable in an axial direction of the pipe unit, the valve seat member having a valve seat surface of an annular shape which is movably in contact with the side wall of the valve body member for sealing a gap between the valve body member and the pipe unit; and
    a biasing member for biasing the valve seat member in a direction to the valve body member in such a way that the valve seat surface is pushed to the side wall of the valve body member,
    wherein the pipe unit has an inside cylindrical portion, an outside cylindrical portion, and a flange portion, the flange portion extending in a radial-outward direction of the pipe unit from an axial end of the outside cylindrical portion,
    wherein the inside cylindrical portion and the outside cylindrical portion are integrally formed with each other by a single continuous material and coaxially arranged with each other, wherein the inside cylindrical portion is formed at a radial-inside position of the outside cylindrical portion, wherein an annular accommodation space is formed between the inside cylindrical portion and the outside cylindrical portion, wherein the biasing member and the valve seat member are provided in the annular accommodation space, wherein an outer peripheral surface of the valve seat member is positioned by an inner peripheral wall of the outside cylindrical portion in a radial direction of the valve seat member, wherein an axial length of the outside cylindrical portion is larger than that of the inside cylindrical portion, wherein the inside cylindrical portion and the outside cylindrical portion are inserted into the housing made of resin, and the flange portion is firmly attached to the housing made of resin by bolts, wherein the valve seat member has a seat projection extending from an inner periphery of the valve seat surface and projecting in a radial-inward direction of the valve seat member, and the seat projection covers an axial end of the inside cylindrical portion.

8. A cooling-water control valve device for controlling a flow amount of cooling water passing through an internal combustion engine, the cooling-water control valve device comprising:

a valve body member having a valve opened portion in a side wall of the valve body member, through which the cooling water flows, the valve body member being rotatable around a valve axis;

a housing for movably accommodating the valve body member, the housing being made of resin;

a pipe unit connected to the housing and operatively communicated to the valve opened portion when the cooling-water control valve device is in a valve opened condition, such that the cooling water flows through an inside of the pipe unit;

a valve seat member having a cylindrical shape and movable in an axial direction of the pipe unit, the valve seat member being made of resin as one single component, the valve seat member having a valve seat surface of an annular shape which is movably in contact with the side wall of the valve body member for sealing a gap between the valve body member and the pipe unit; and a biasing member for biasing the valve seat member in a direction to the valve body member in such a way that the valve seat surface is pushed to the side wall of the valve body member, wherein the pipe unit has an inside cylindrical portion, an outside cylindrical portion, and a flange portion, the flange portion extending in a radial-outward direction of the pipe unit from an axial end of the outside cylindrical portion, wherein the inside cylindrical portion and the outside cylindrical portion are integrally formed with each other by a single continuous material and coaxially arranged with each other, wherein the inside cylindrical portion is formed at a radial-inside position of the outside cylindrical portion, wherein an annular accommodation space is formed between the inside cylindrical portion and the outside cylindrical portion, wherein the biasing member and the valve seat member are provided in the annular accommodation space, wherein a radial clearance between an outer peripheral surface of the valve seat member and an inner peripheral wall of the outside cylindrical portion is smaller than a radial clearance between an inner peripheral surface of the valve seat member and an outer peripheral wall of the inside cylindrical portion, wherein the outer peripheral surface of the valve seat member is positioned by the inner peripheral wall of the outside cylindrical portion in radial direction of the valve seat member, wherein an axial length of the outside cylindrical portion is larger than that of the inside cylindrical portion, wherein the inside cylindrical portion and the outside cylindrical portion are inserted into the housing made of resin, and the flange portion is firmly attached to the housing made of resin by bolts, wherein the valve seat member has a seat projection extending from an inner periphery of the valve seat surface and projecting in a radial-inward direction of the valve seat member, and the seat projection covers an axial end of the inside cylindrical portion.

9. The cooling-water control valve device according to claim 4, wherein a stepped portion is formed in the inner peripheral surface of the valve seat member; and the packing is provided in the stepped portion.

10. The cooling-water control valve device according to claim 6, wherein the seal member is provided between (i) the outer peripheral wall of the outside cylindrical portion which is integrally formed with the inside cylindrical portion and (ii) an inner periphery of the housing.

11. The cooling-water control valve device according to claim 1, wherein:

an axial end of the flange portion is attached to an axial end of the housing.

12. The cooling-water control valve device according to claim 1, wherein:

the inside cylindrical portion and the outside cylindrical portion are inserted into the housing and the flange portion is not inserted in the housing.

13. The cooling-water control valve device according to claim 1, wherein:

the pipe unit is made of resin.

* * * * *